US012573936B2

(12) United States Patent　　(10) Patent No.:　US 12,573,936 B2

Hernandez Manchola et al.　　(45) Date of Patent:　Mar. 10, 2026

---

(54) CONVERTER AND METHOD OF OPERATING A CONVERTER

(71) Applicant: Siemens Energy Global GmbH & Co. KG, Munich (DE)

(72) Inventors: Alvaro Jose Hernandez Manchola, Erlangen (DE); Thomas Haupt, Bamberg (DE); Matthias Foehr, Dormitz (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 246 days.

(21) Appl. No.: 17/988,936

(22) Filed: Nov. 17, 2022

(65) Prior Publication Data

US 2023/0155473 A1　　May 18, 2023

(30) Foreign Application Priority Data

Nov. 17, 2021　　(EP) ..................................... 21208714

(51) Int. Cl.
| | |
|---|---|
| *H02M 1/32* | (2007.01) |
| *H02J 3/0012* | (2026.01) |
| *H02J 3/38* | (2006.01) |
| *H02M 1/00* | (2006.01) |

(52) U.S. Cl.
CPC ......... *H02M 1/0025* (2021.05); *H02J 3/0012* (2020.01); *H02J 3/381* (2013.01); *H02M 1/325* (2021.05); *H02J 2300/28* (2020.01)

(58) Field of Classification Search
CPC ...... H02J 3/36; H02J 3/381; H02J 3/38; H02J 3/24; H02J 3/16; H02J 3/18; H02J 3/40; H02J 3/1857; H02M 1/32; H02H 7/268; H02H 7/483; H02H 7/26
See application file for complete search history.

(56) References Cited

U.S. PATENT DOCUMENTS

| | | | |
|---|---|---|---|
| 10,704,534 B2 * | 7/2020 | Biris ...................... | H02J 3/1892 |
| 2007/0223262 A1 * | 9/2007 | Stancu ...................... | B60L 3/04 |
| | | | 363/57 |
| 2019/0052087 A1 | 2/2019 | Zhao et al. | |
| 2019/0190274 A1 * | 6/2019 | Fazeli ...................... | H02J 7/35 |
| 2021/0044115 A1 | 2/2021 | Quitmann et al. | |

OTHER PUBLICATIONS

Wang, Cunping et al: "Research on the direct current control method and simulation of flexible HVDC"; 2016 IEEE PES Asia-Pacific Power and Energy Engineering Conference (APPEEC), IEEE; Oct. 25, 2016 (Oct. 25, 2016), pp. 2023-2027, XP033021108.

Liang et al., Control of multi-terminal VSC-HVDC transmission for offshore wind power, pp. 1-10.

Elgamasy et al., Fault Detection Techniques for HVDC-VSC Scheme Using Measurement at AC Side, 2017 Nineteenth International Middle East Power Systems Conference (MEPCON), Dec. 19-21, 2017, Menoufia University, Egypt, pp. 876-880.

* cited by examiner

*Primary Examiner* — Bryan R Perez

(74) *Attorney, Agent, or Firm* — Laurence A. Greenberg; Werner H. Stemer; Ralph E. Locher

(57) ABSTRACT

A converter has an AC side to connect to an AC network. A converter control is configured to set a current reference limit to limit a converter current. The converter control is configured to reduce the limit in case a fault is detected in the AC network. There is also described a combination of the converter in a power system with a renewable power source and a corresponding method of operating a converter in a power system with a renewable power source.

5 Claims, 2 Drawing Sheets

CONVERTER AND METHOD OF OPERATING A CONVERTER

CROSS-REFERENCE TO RELATED APPLICATION

This application claims the priority, under 35 U.S.C. § 119, of European Patent Application EP 21208714, filed Nov. 17, 2021; the prior application is herewith incorporated by reference in its entirety.

FIELD AND BACKGROUND OF THE INVENTION

The present invention relates to a converter comprising an AC side to connect to an AC network (AC grid), and a converter control configured to set a current reference limit to limit a converter current.

The converter control usually limits the converter currents which could otherwise exceed the current carrying capacity of the converter (or its components). Limiting the current reference means that no values of the current reference above a certain limit (threshold) are allowed by the converter control.

The transmission capacity of converters, particularly voltage sourced (VSC) HVDC converters, is observed to be increasing. The corresponding ratings are expected to lie in a range of 2000 MW up to 4000 MW in the future. Higher ratings potentially cause higher short circuit current contribution in the case of a fault (e.g., a phase-to-phase or a ground fault on the AC side of the converter due to cable or cable termination damages). Moreover, driven by the demand for decarbonization, so-called green insulation gases are gaining market share for such equipment, which often have reduced current carrying, making and breaking capabilities. It is therefore important to maintain the potentially occurring stresses within the capabilities of the corresponding components, particularly generators and switchgears.

SUMMARY OF THE INVENTION

It is accordingly an object of the invention to provide a converter and a method which overcome the above-mentioned disadvantages of the heretofore-known devices and methods of this general type and which provides for an improvement that renders the converter as reliable as possible.

With the above and other objects in view there is provided, in accordance with the invention, a converter having:
    an AC side for connection to an AC network; and
    a converter control configured to set a current reference limit in order to limit a converter current of the converter;
    the converter control being configured to reduce the current reference limit in case of a fault in the AC network.

In other words, the novel converter control, or controller, is configured to reduce the threshold in case of a fault detected in said AC network. The converter control can be equipped with an additional module for the operation of reducing the current reference limit. Such an additional module can be implemented as a part of and included in the usual converter control system (e.g., as an additional feedback loop). The current reference limit is preferably reduced as soon as the fault is detected by a suitable detection means. An occurrence of a fault can be for example detected as a voltage drop in the AC network measured by a suitable voltage measurement system. The decrease of the voltage reference value can therefore be used as a fault indicator. By reducing the current reference limit, further reduction of (allowed) current reference values is achieved.

The present invention enables the limitation of potential short circuit stresses caused for example by an HVDC converter through an AC voltage dependent current limitation. Limiting the short circuit currents allows utilizing the economic benefit of connecting renewable energy generators directly to an HVDC converter station (e.g., offshore wind park with turbines connected directly to an HVDC converter station without the need of several additional AC collector platforms). It particularly allows to increase the rating of renewable energy resources connected through a VSC HVDC (e.g., offshore wind parks) without increasing the short circuit stresses in the generation equipment (e.g., in a generator switchgear). This in turn enables using standardized medium or high voltage components which in addition provides cost advantages. Furthermore, the present invention does not have negative effects on the dynamic performance of the converter. The adaptive converter admittance presented herein also allows to continue the active damping of harmonics which takes place during steady state conditions.

Preferably, the converter control is configured to reduce the limit, or threshold, as a function of a voltage reference value. This means that, at least within a certain range of voltage reference values, there is a one-to-one correspondence between a given voltage reference value and a value of the limit assigned to the given voltage reference value. The range of voltage reference values may lie between 0% and 100% of the nominal voltage of the AC grid under operating conditions of the converter (the setup of the converter control usually involves the knowledge of the nominal AC voltage of the respective grid where the converter is to be operated). During grid fault conditions a voltage reference provided by an alternating current control (ACCC) to a converter modulator is reduced by a central converter control unit to limit the converter side currents of the converter. The voltage reference can be used to quickly identify fault conditions in the AC network. Accordingly, it is passed through a non-linear gain to further limit the current reference values provided by suitable control instance (e.g., a grid forming control). This solution can therefore also be interpreted as an adaptive virtual admittance which can differentiate between steady state conditions and transient faults in the grid. Quickly identifying AC fault conditions in the AC network and adaptively adjustment of the virtual admittance of the converter allows a quick reduction of converter fault currents. The AC voltage dependent current limitation effectively identifies fault conditions in the AC grid and immediately further limits converter side currents to a safe value, which guarantees grid side equipment integrity. The function can be implemented in the control system as a suitable look up table.

The above-mentioned function preferably is non-linear. A simple example of a non-linear function is a (continuous) piecewise linear function, where the linear sections have different slopes. The non-linearity of the function advantageously reflects the non-linearity of the respective transmission system.

In accordance with a preferred feature, the function has a maximum function value equal to one for voltage reference values exceeding 85%, more preferably exceeding 90%, of a nominal AC voltage of the AC network. Accordingly, the reduction of current limits only takes place outside the typical steady state voltage band.

According to an embodiment the converter is a modular multi-level converter. A modular multilevel converter is particularly characterized by at least one converter valve comprising a series circuit of switching modules. Each switching module comprises its own energy storage element (e.g., a capacitor) and semiconductor switches. Every switching module can be individually controlled to provide certain module voltage at its terminals (e.g., the capacitor voltage or a zero voltage in case of a half-bridge module). A modular multilevel converter for HVDC applications usually comprises three parallel phase modules, wherein each of the phase modules has two converter arms (valves) arranged between a respective AC connection and one of two DC poles. Every converter arm comprises an arm inductance (choke) and a series of submodules, wherein each submodule comprises semiconductor switches and an energy storage, e.g., a capacitor. The semiconductor switches and the capacitor of said submodule are e.g., arranged to form a so-called half-bridge circuit, assembled to form a multilevel arrangement.

The converter of the present invention is preferably used in a power system comprising a renewable power source connected via said converter to said AC network. The renewable power source can particularly be a wind park comprising wind turbines and corresponding generators. Standard class renewable generators, (e.g., in wind turbines) are equipped with standardized medium or high voltage components with relatively low current carrying capabilities. Therefore, it is essential to maintain the potentially occurring stresses within their capabilities. The use of a converter and/or converter control in accordance with the present invention enables the limitation of potential short circuit stresses caused in the connected array cables, the wind turbines and especially the wind turbine circuit breakers. Thus, it enables the usage of standard class wind turbines while utilizing all benefits of a direct integrated HVDC connection on medium or high voltage potential, e.g., at 66 kV AC or above.

With the above and other objects in view there is also provided, in accordance with the invention, a method of operating a converter, wherein the converter comprises an AC side to connect to an AC network and a converter control. The method comprises the steps of setting a current reference limit to limit a converter current and reducing the limit in case of a fault in said AC network. According to an embodiment, the voltage reference output of a converter modulator is continuously observed. As long as no fault occurs, the steady state limits are kept. As soon as a fault is detected (e.g., if the voltage reference drops below a given threshold), the AC voltage dependent current limitation is used. Accordingly, the current limits of the converter control system (e.g., a grid forming control system) are adjusted. The corresponding current references can be issued to a current controller of the converter control system. The current controller on its output provides then the corresponding voltage reference which can be issued to the respective converter modulator.

Other features which are considered as characteristic for the invention are set forth in the appended claims.

Although the invention is illustrated and described herein as embodied in a converter and a method of operating a converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
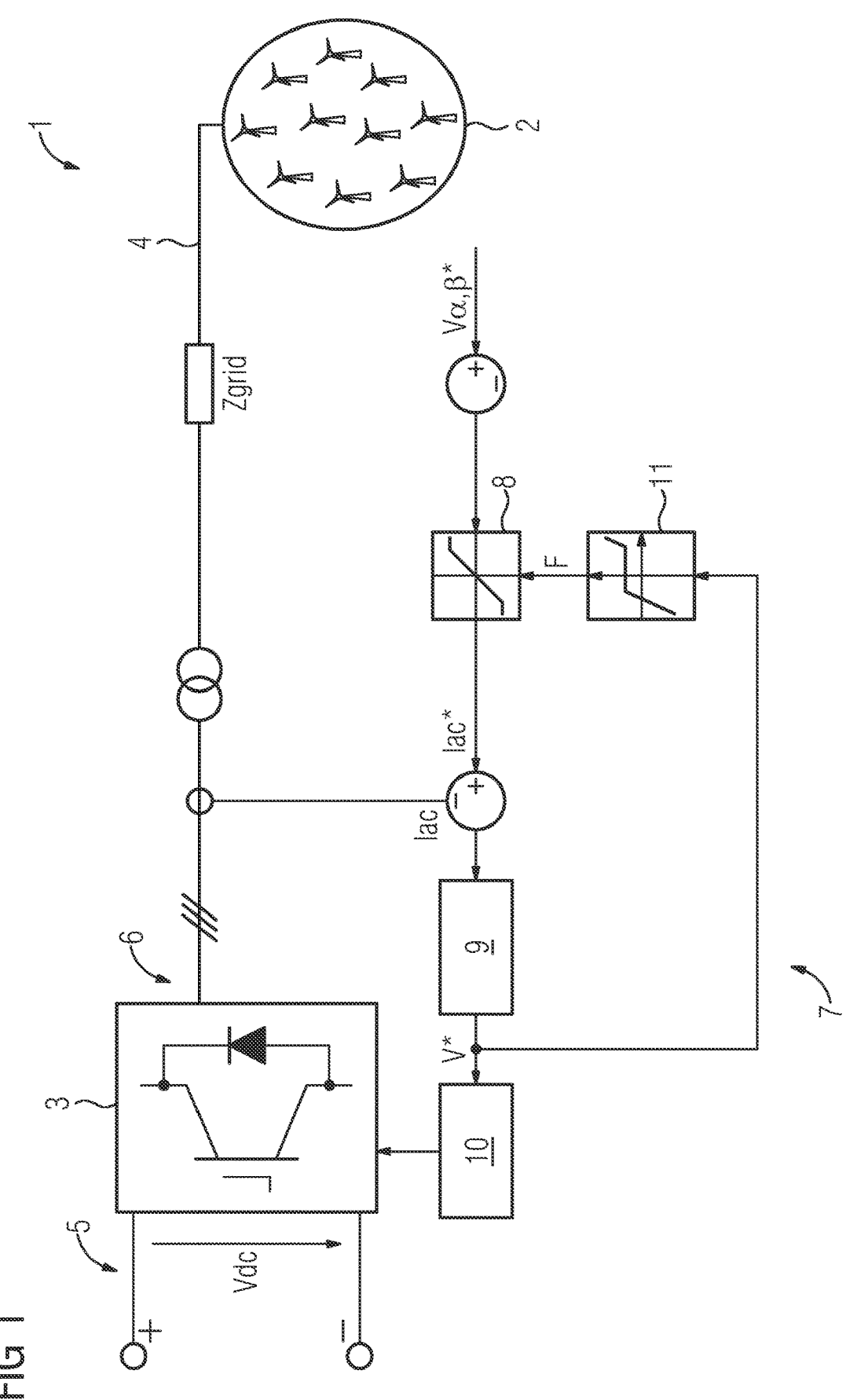
FIG. 1 shows a schematic view of a power system with a renewable power source and a converter.

Referring now to the figures of the drawing in detail and first, in particular, to FIG. 1 thereof, there is shown a power system 1 comprising a renewable power source 2 (a wind park with a plurality of wind turbines) connected to a converter 3 via an AC network 4. A network impedance is denoted as Zgrid. The power generated in the power source 2 is fed by the converter 3 into an HVDC (high voltage direct current) line and further transferred to a power supply grid with multiple loads. The converter 3 is a voltage sourced converter (VSC), in particular a modular multilevel converter having a DC side 5 to connect to the HVDC line and an AC side 6 to connect to the AC network 4. The DC voltage on the DC side 5 of the converter 3 is denoted by Vdc.

A converter control 7 is configured to control the semiconductor switching components of the converter 3. The converter control 7 comprises a block or module 8 configured to set a current reference limit to limit a converter current. A current reference value lac* is provided at the output of the block 8. The current reference lac* is compared with a measured actual current lac, wherein an alternating current control 9 provides a voltage reference V* based on the difference between lac* and lac. The voltage reference V* is forwarded to a modulator 10 configured to provide switching signals for the switching modules of the converter 3 (respectively for the semiconductor switching units of the switching modules). The converter control 7 further comprises an AC voltage dependent current limitation block 11. The reference voltage V* is provided as input to the AC voltage dependent current limitation block 11. The AC voltage dependent current limitation block 11 provides as its output a limiting factor F which is a function of a value of the reference voltage V*. The limiting factor F is forwarded to the block 8 to adjust the converter current limits.

Figure 2:
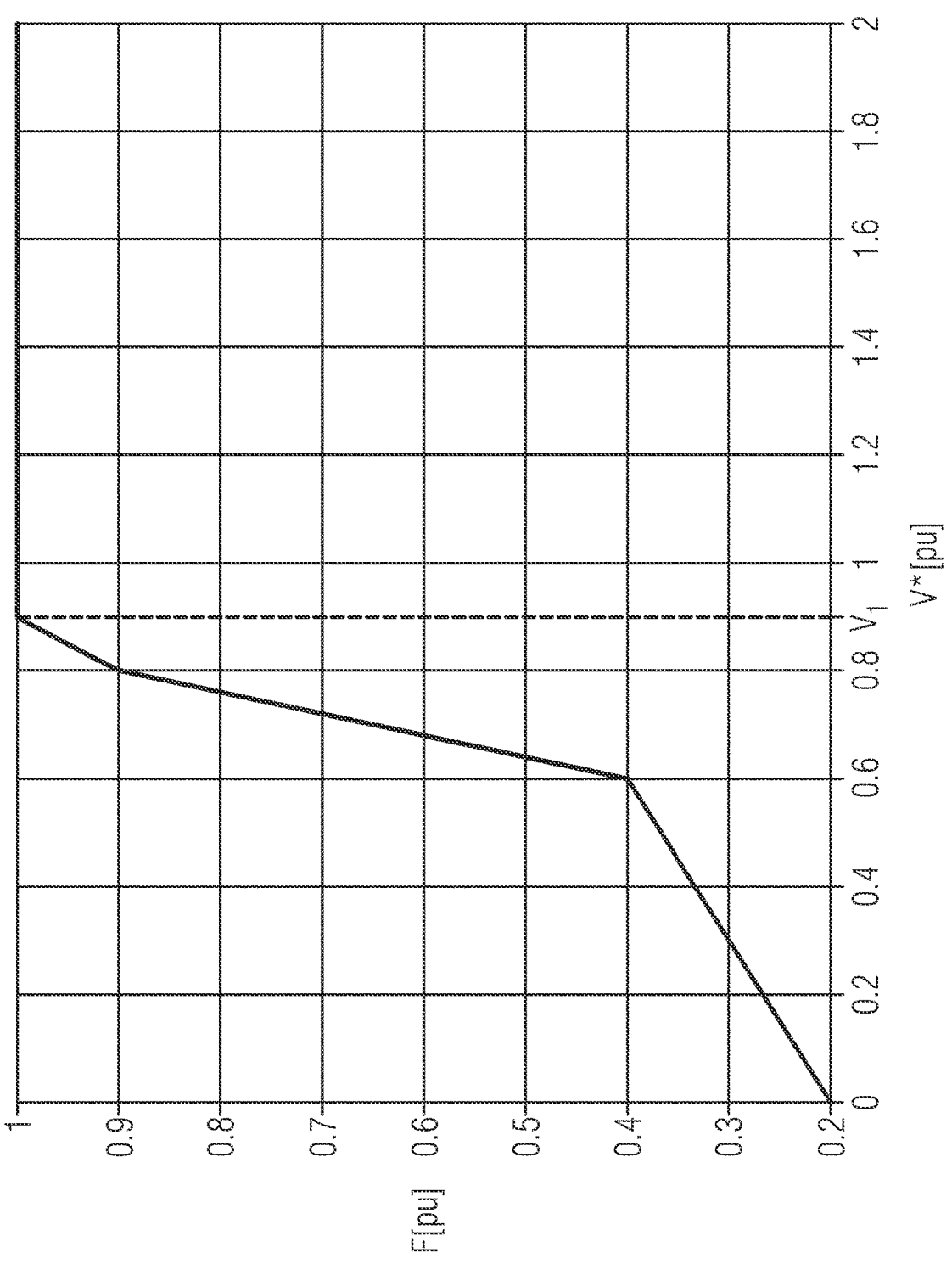
FIG. 2 shows a diagram representing a non-linear function for the converter control.

FIG. 2 depicts a diagram showing an example of a non-linear functional dependence between the limiting factor F and the reference voltage V*. The value of the factor F is equal to 1 at a voltage value V1, wherein V1=0.9. Below V1, i.e., at voltage levels below 0.9, the function value of F decreases non-linearly. The functional dependence shown in FIG. 2 is linear by sections, i.e., it is formed and composed of a plurality of linear sections.

The invention claimed is:

1. A converter, comprising: an AC side for connection to an AC network; and a converter control configured to set a current reference limit in order to limit a converter current of the converter; said converter control being configured to reduce the current reference limit as soon as a fault is detected in the AC network when a voltage reference drops below a given threshold; wherein the converter control is configured to reduce the limit as a function of a voltage reference value; wherein the function is a non-linear function; wherein the function has a maximum function value of 1 for voltage reference values exceeding 85% of a nominal AC voltage of the AC network.

2. The converter according to claim 1, wherein the function has a maximum function value of 1 for voltage reference values exceeding 90% of a nominal AC voltage of the AC network.

3. The converter according to claim 1, wherein the converter is a modular multilevel converter.

4. A power system, comprising: a renewable power source, a converter, and an AC network connecting said converter to said power source; said converter having an AC side for connection to said AC network and a converter control configured to set a current reference limit in order to limit a converter current; said converter control being configured to reduce the current reference limit as soon as a fault is detected in the AC network when a voltage reference drops below a given threshold; wherein the converter control is configured to reduce the limit as a function of a voltage reference value; wherein the function is a non-linear function; wherein the function has a maximum function value of 1 for voltage reference values exceeding 85% of a nominal AC voltage of the AC network.

5. A method of operating a converter, the converter having an AC side to connect to an AC network and a converter control, the method comprising: setting a current reference limit to limit a converter current; and as soon as a fault is detected in the AC network when a voltage reference drops below a given threshold, reducing the reference limit; wherein the converter control is configured to reduce the limit as a function of a voltage reference value; wherein the function is a non-linear function; wherein the function has a maximum function value of 1 for voltage reference values exceeding 85% of a nominal AC voltage of the AC network.

* * * * *